US012763013B2

(12) United States Patent
Moon et al.

(10) Patent No.: US 12,763,013 B2
(45) Date of Patent: Oct. 13, 2026

(54) DISPLAY DEVICE, ELECTRONIC DEVICE, AND METHOD OF DRIVING DISPLAY DEVICE

(71) Applicant: Samsung Display Co., Ltd., Yongin-Si (KR)

(72) Inventors: Gyeong Ub Moon, Yongin-si (KR); Yu Na Kim, Yongin-si (KR); Jong Yeop An, Yongin-si (KR); Dong Wook Yang, Yongin-si (KR); Hyeon Jun Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/198,392

(22) Filed: May 5, 2025

(65) Prior Publication Data

US 2025/0391351 A1 Dec. 25, 2025

(30) Foreign Application Priority Data

Jun. 20, 2024 (KR) ........................ 10-2024-0080017
Sep. 24, 2024 (KR) ........................ 10-2024-0129331

(51) Int. Cl.
*G09G 3/3225* (2016.01)

(52) U.S. Cl.
CPC ... *G09G 3/3225* (2013.01); *G09G 2320/0233* (2013.01); *G09G 2360/142* (2013.01); *G09G 2360/16* (2013.01)

(58) Field of Classification Search
CPC ........... G09G 2360/14; G06V 40/1318; G06V 40/145
See application file for complete search history.

(56) References Cited

U.S. PATENT DOCUMENTS

| | | | |
|---|---|---|---|
| 11,922,717 B2 | 3/2024 | Bae et al. | |
| 11,984,068 B2 | 5/2024 | Lee | |
| 2020/0279090 A1* | 9/2020 | He | G06V 40/1318 |
| 2022/0147730 A1* | 5/2022 | Kim | G06V 40/1318 |
| 2024/0237499 A9 | 7/2024 | Park et al. | |

FOREIGN PATENT DOCUMENTS

| | | |
|---|---|---|
| KR | 102600973 B1 | 11/2023 |
| KR | 1020240055973 A | 4/2024 |
| KR | 102715833 B1 | 10/2024 |

* cited by examiner

*Primary Examiner* — Kevin M Nguyen
(74) *Attorney, Agent, or Firm* — Innovation Counsel LLP

(57) ABSTRACT

A method of driving a display device is disclosed in which the display device includes a pixel and a photo sensing pixel. The method includes: performing a first sensing operation of emitting light by the pixel and operating the photo sensing pixel; performing a second sensing operation of not emitting light by the pixel and operating the photo sensing pixel; and calculating a compensation value for compensating degradation of the pixel based on first sensing data according to the first sensing operation and second sensing data according to the second sensing operation.

20 Claims, 13 Drawing Sheets

DISPLAY DEVICE, ELECTRONIC DEVICE, AND METHOD OF DRIVING DISPLAY DEVICE

CROSS-REFERENCE TO RELATED APPLICATION

The present application claims priority under 35 U.S.C. § 119(a) to Korean patent application No. 10-2024-0080017, filed on Jun. 20, 2024, and Korean patent application No. 10-2024-0129331, filed on Sep. 24, 2024, in the Korean Intellectual Property Office, the entire disclosure of which is incorporated herein by reference.

BACKGROUND

1. Technical Field

The present disclosure relates to a display device, an electronic device, and a method of driving a display device.

2. Related Art

A display device displays an image using pixels each of which includes a light emitting element. When the light emitting element is implemented as an organic light emitting diode, the light emitting element is degraded due to its use, and the degraded light emitting element (or the pixel including the same) emits light with a luminance lower than a target luminance.

The display device calculates an amount of use and compensates for a grayscale value (or image data) based on the amount of use (or degradation amount). Accordingly, pixels of the display device emit light closer to a target luminance.

SUMMARY

Embodiments provide a display device, an electronic device, and a method of driving a display device, in which degradation can be more accurately compensated.

In accordance with an embodiment of the present disclosure, there is provided a method of driving a display device including a pixel and a photo sensing pixel, the method including: performing a first sensing operation of emitting light by the pixel and operating the photo sensing pixel; performing a second sensing operation of not emitting light by the pixel and operating the photo sensing pixel; and calculating a compensation value for compensating degradation of the pixel, based on first sensing data according to the first sensing operation and second sensing data according to the second sensing operation.

The pixel may include a light emitting element, the photo sensing pixel may include a light receiving element, and the light emitting element and the light receiving element may be disposed in a same layer.

Some of the light emitted from the pixel may be reflected inside the display device to reach the photo sensing pixel located adjacent to the pixel.

The calculating the compensation value may include: acquiring differential data by performing a subtraction operation on the first sensing data and the second sensing data; calculating a degradation degree of the pixel based on comparing the differential data and baseline data; and calculating the compensation value, based on the degradation degree. The baseline data may include an average value of the first sensing data or the differential data, or the baseline data may be differential data generated before the pixel is degraded.

The performing the first sensing operation may include driving the pixel to emit light with a maximum brightness.

The performing the first sensing operation may include driving pixels of the display device to emit light in a whole of a display surface of the display device.

The method may further include: performing a third sensing operation of allowing the pixel to emit light and allowing the photo sensing pixel to operate by reflecting the compensation value; determining whether values of third sensing data according to the third sensing operation are uniform; and repeating the performing of the first sensing operation, the performing of the second sensing operation, and the calculating of the compensation value when the values of the third sensing data are not uniform.

The pixel may include sub-pixels emitting each of which is configured to emit light of a different color. The performing the first sensing operation may drive only one sub-pixel of the sub-pixels to emit light. The calculating the compensation value may calculate the compensation value for the one sub-pixel of the sub-pixels.

The method may further include determining whether an object exists on a display surface of the display device through a touch sensor. The first sensing operation may be performed when the object does not exist on the display surface. The first sensing operation may not be performed when the object exists on the display surface.

The method may further include determining whether an illuminance calculated based on the second sensing data is smaller than a reference value. The first sensing operation may be performed when the illuminance is smaller than the reference value. The first sensing operation may not be performed when the illuminance is greater than or equal to the reference value.

In accordance with an embodiment of the present disclosure, there is provided a display device including: a display panel including a pixel and a photo sensing pixel; a panel driver configured to drive the pixel to emit light; and a sensor driver configured to operate the photo sensing pixel, wherein the sensor driver acquires first sensing data by operating the photo sensing pixel while the pixel emits light, and acquires second sensing data by operating the photo sensing pixel while the pixel does not emit light, and wherein the panel driver calculates a compensation value for compensating degradation of the pixel based on the first sensing data and the second sensing data.

The pixel may include a light emitting element, the photo sensing pixel may include a light receiving element, and the light emitting element and the light receiving element may be disposed in a same layer.

Some of the light emitted from the pixel may be reflected inside the display device to reach the photo sensing pixel located adjacent to the pixel.

The panel driver may acquire differential data by performing a subtraction operation on the first sensing data and the second sensing data, calculate a degradation degree of the pixel based on comparing the differential data and baseline data, and calculate the compensation value, based on the degradation degree. The baseline data may include an average value of the first sensing data or the differential data, or the baseline data may be differential data generated before the pixel is degraded.

When the sensor acquires the first sensing data, the panel driver may drive pixels of the display device to emit light with a maximum brightness in a whole of a display surface of the display panel.

The panel driver may allow the pixel to re-emit light by reflecting the compensation value, and the sensor driver may acquire third sensing data by allowing the photo sensing pixel to operate while the pixel re-emits light, and determine whether values in the third sensing data are uniform.

The pixel may include sub-pixels each of which emits light of a different color. The sensor driver may acquire the first sensing data by operating the photo sensing pixel while only one sub-pixel of the sub-pixels emits light, and calculate a compensation value for the one sub-pixel of the sub-pixels.

The display device may further include a touch sensor configured to sense an object on a display surface of the display device. The sensor driver may acquire the first sensing data when the object does not exist on the display surface, and may not acquire the first sensing data when the object exists on the display surface.

The sensor driver may determine whether an illuminance calculated based on the second sensing data is smaller than a reference value, acquire the first sensing data when the illuminance is smaller than the reference value, and may not acquire the first sensing data when the illuminance is greater than or equal to the reference value.

In accordance with an embodiment of the present disclosure, there is provided an electronic device including: a processor configured to provide an input image data; a display device configured to display an image, based on the input image data; and a power supply configured to supply power to the display device, wherein the display device includes: a display panel including a pixel and a photo sensing pixel; a panel driver configured to drive the pixel to emit light; and a sensor driver configured to operate the photo sensing pixel, wherein the sensor driver acquires first sensing data by operating the photo sensing pixel while the pixel emits light, and acquires second sensing data by allowing the photo sensing pixel to operate while the pixel does not emit light, and wherein the panel driver calculates a compensation value for compensating degradation of the pixel based on the first sensing data and the second sensing data.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the present disclosure to those skilled in the art.

In the drawing figures, dimensions may be exaggerated for clarity of illustration. It will be understood that when an element is referred to as being "between" two elements, it can be the only element between the two elements, or one or more intervening elements may also be present between the two elements. Like reference numerals refer to like elements throughout.

DETAILED DESCRIPTION

Figure 1:
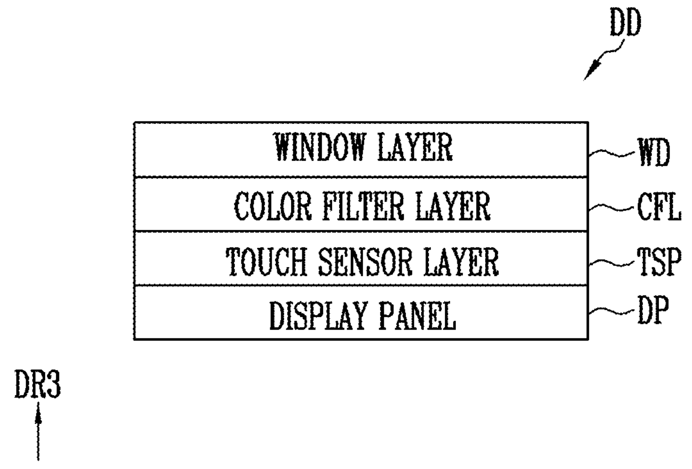
FIG. 1 is a schematic sectional view illustrating a display device in accordance with embodiments of the present disclosure.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "comprises" and "includes" (as well as variations such as "including") when used in this specification, specify the presence of stated features, integers, steps, operations, elements, or components, but do not preclude the presence or addition of one or more other features, integers, steps, operations, elements, components, or groups thereof.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Some embodiments are described in the accompanying drawings in relation to functional blocks, units, or modules. Those skilled in the art will understand that these blocks, units, or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, or modules implemented by microprocessors or other similar hardware, the units, or modules are programmed and controlled by using software, to perform various functions discussed in the present disclosure, and may be selectively driven by firmware or software. In addition, each block, each unit, or each module may be implemented by dedicated hardware or by a combination dedicated hardware to perform some functions of the block, the unit, or the module and a processor (e.g., one or more programmed microprocessors and associated circuitry) to perform other functions of the block, the unit, or the module. In some embodiments, the blocks, the units, or the modules may be physically separated into two or more individual blocks, two or more individual units, or two or more individual modules without departing from the scope of the present disclosure. Also, in some embodiments, the blocks, the units, or the modules may be physically separated into more complex blocks, more complex units, or more complex modules without departing from the scope of the present disclosure.

Hereinafter, a display device in accordance with an embodiment of the present disclosure will be described with reference to the accompanying drawings.

FIG. 1 is a schematic sectional view illustrating a display device in accordance with embodiments of the present disclosure.

Referring to FIG. 1, the display device DD may be configured to emit light. The display device DD may include a display panel DP and a touch sensor layer TSP. In some embodiments, the display device DD may further include a color filter layer CFL and a window layer WD.

The display panel DP may display visual information. The display panel DP may include various light sources capable of providing light. For example, the display panel DP may include an organic light emitting diode.

The touch sensor layer TSP (or touch sensor) may be disposed directly on the display panel DP, or be disposed on the display panel DP with a separate layer, such as an adhesive layer or a substrate (or insulating layer), which is interposed therebetween.

The touch sensor layer TSP may be disposed on a surface from which an image of the display panel DP is emitted, and receive a touch input of a user. The touch sensor layer TSP may acquire information on the touch input. The touch sensor layer TSP may recognize a touch event of the display device DD through a hand of the user or a separate input means. The touch sensor layer TSP may recognize the touch event, using a capacitance method.

The touch sensor layer TSP may sense a touch input, using a mutual capacitance method or sense the touch input, using a self-capacitance method.

The color filter layer CFL may be disposed on the touch sensor layer TSP. The color filter layer CFL may include color filters which allow light of one color to be selectively transmitted therethrough and include a pigment or a dye.

The window layer WD may be disposed on the color filter layer CFL. The window layer WD may protect lower layers from external impact, and provide an input surface and a display surface to the user. The window layer WD may allow light to be transmitted therethrough. The window layer WD may be coupled on the color filter layer CFL, using various methods, such as an adhesive.

Figure 2:
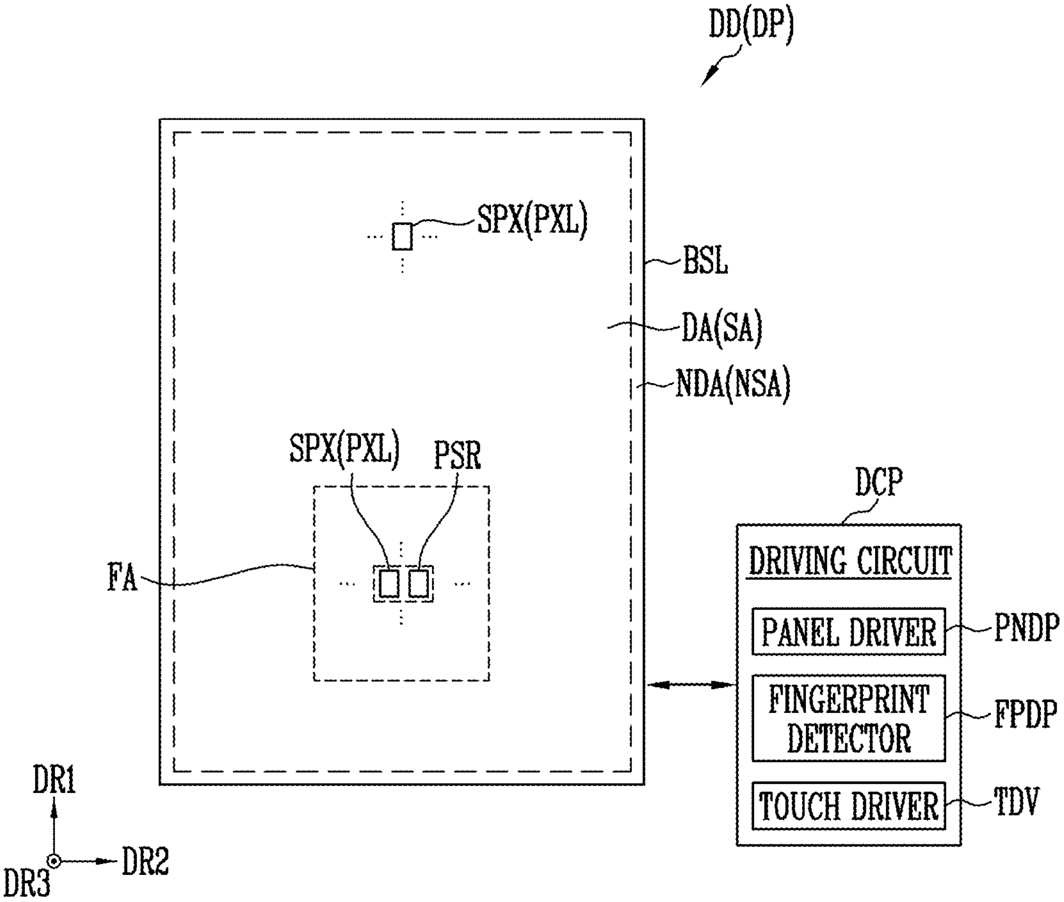
FIG. 2 is a schematic plan view illustrating an embodiment of the display device shown in FIG. 1.

FIG. 2 is a schematic plan view illustrating an embodiment of the display device shown in FIG. 1. In FIG. 2, the display panel DP included in the display device DD shown in FIG. 1 and a driving circuit DCP are schematically illustrated.

Referring to FIG. 2, the display device DD may include a base layer BSL, and at least one pixel PXL (or light emitting pixel) and at least one photo sensing pixel PSR, which are disposed on the base layer BSL. The display device DD may include the driving circuit DCP. The driving circuit DCP may include a panel driver PNDP, a fingerprint detector FPDP, and a touch driver TDV. Each of the panel driver PNDP, the fingerprint detector FPDP, and the touch driver TDV may be implemented as an integrated circuit (or integrated circuit chip), or at least two of the panel driver PNDP, the fingerprint detector FPDP, and the touch driver TDV may be implemented into one integrated circuit.

The base layer BSL may form a base surface of the display device DD. In some embodiments, the base layer BSL may be a lower substrate for disposing layers forming the display device DD. The base layer BSL may be a rigid or flexible substrate or film. For example, the base layer BSL may include a glass material. Alternatively, the base layer BSL may include a silicon material. Alternatively, the base layer BSL may include polyimide. However, the present disclosure is not limited thereto.

A plane defined in this specification, is a plane extending in a first direction DR1 and a second direction DR2, and may be defined with respect to a plane on which the base layer BSL is disposed. In some embodiments, a third direction DR3 may be the thickness direction of the base layer BSL. The third direction DR3 may be a light emission direction of the display device DD.

The display device DD (or the display panel DP) may include a display area DA in which the pixel PXL is formed and a non-display area NDA in which the pixel PXL is not formed. The non-display area NDA may surround at least a portion of the display area DA. Various lines may be disposed in the non-display area NDA, pads may be disposed in the non-display area NDA, and at least a portion of the driving circuit DCP may be disposed in the non-display area NDA.

The pixel PXL may include sub-pixels SPX. Two or more sub-pixels SPX may form one pixel PXL (or pixel unit).

In some embodiments, the pixels PXL (or the sub-pixels SPX) may be arranged according to a stripe arrangement structure, a PENTILE® arrangement structure, or the like, but the present disclosure is not limited thereto.

The display device DD may include a fingerprint sensing area FA. The fingerprint sensing area FA may be an area capable of sensing a fingerprint input of a user. The fingerprint is representative information among biometric information such as heart rate, blood pressure, and moisture level (or moisture level of skin). Hereinafter, the expression "fingerprint sensing" will be understood as "biometric information sensing" or feasible one.

The fingerprint sensing area FA may overlap with the display area DA when viewed on a plane. The fingerprint sensing area FA may be formed inside the display area DA, and partially surround a portion of the display area DA. The range in which the fingerprint sensing area FA is formed in the display area DA is not limited to a specific example.

In some embodiments, the fingerprint sensing area FA may accord with the display area DA. The pixel PXL may also be disposed in the fingerprint sensing area FA. Accordingly, a fingerprint of the user may be sensed in an area in which an image is viewed.

The photo sensing pixel PSR may sense that light emitted from a light source (e.g., the pixel PXL) is reflected by an external object (e.g., a finger of the user, or the like). For example, each of the photo sensing pixels PSR may sense information on a user fingerprint input.

Also, the photo sensing pixel PSR may sense light emitted from a light source (e.g., the pixel PXL). For example, a portion of light emitted from the pixel PXL may be reflected or refracted inside the display device DD (or the display panel DP) to be incident onto the photo sensing pixel PSR, and the photo sensing pixel PSR may sense the portion of the light (see FIG. 5). Degradation compensation (or image quality correction) of the pixel PXL may be performed based on the portion of the light.

The driving circuit DCP may drive the display panel DP. For example, the driving circuit DCP may output a data signal corresponding to image data to the display panel DP or output a driving signal for the photo sensing pixels PSR, and receive an electrical signal (e.g., a sensing signal) received from the photo sensing pixels PSR. The driving circuit DCP may detect a fingerprint form of the user, using electrical signals. The driving circuit DCP may further detect biometric information such as heart rate, blood pressure, and moisture level (or moisture level of skin), in addition to the fingerprint form.

The driving circuit DCP may include the panel driver PNDP and the fingerprint detector FPDP (or sensor driver). For convenience, in FIG. 2, it is illustrated that the panel driver PNDP and the fingerprint detector FPDP are separated from each other. However, the present disclosure is not limited thereto. For example, at least a portion of the fingerprint detector FPDP may be integrated together with the panel driver PNDP, or operate in linkage with the panel driver PNDP.

The panel driver PNDP may supply a data signal corresponding to an image data signal to the sub-pixels SPX of the display area DA while sequentially scanning the sub-pixels SPX. The display panel DP may display an image corresponding to image data.

The panel driver PNDP may supply a driving signal for fingerprint sensing to the sub-pixels SPX. The driving signal may be provided to allow the sub-pixels SPX to emit light, thereby operating as a light source for fingerprint input sensing of the photo sensing pixels PSR. In an embodiment, the panel driver PNDP may also supply, to the photo sensing pixels PSR, the driving signal for fingerprint sensing or another driving signal. However, the present disclosure is not limited thereto. Driving signals for fingerprint sensing may be provided by the fingerprint detector FPDP.

Also, the panel driver PNDP may supply a driving signal for degradation compensation (or degradation measurement) to the sub-pixels SPX. In an embodiment, the panel driver PNDP may also supply, to the photo sensing pixels PSR, the driving signal for degradation compensation or another driving signal. However, the present disclosure is not limited thereto, and driving signals for degradation compensation may be provided by the fingerprint detector FPDP.

The fingerprint detector FPDP may detect biometric information such as a user fingerprint, based on a sensing signal received from the photo sensing pixels PSR. In some embodiments, the fingerprint detector FPDP may supply the driving signals to the photo sensing pixels PSR or the sub-pixels SPX.

In embodiments, the driving circuit DCP may calculate a degradation degree of the sub-pixels SPX, based on a sensing signal received from the photo sensing pixels PSR, and calculate a compensation value for compensating for degradation of the sub-pixels SPX, based on the degradation degree. The driving circuit DCP may compensate for image data, using the compensation value, and output a data signal corresponding to the corrected image data.

The driving circuit DCP may drive the touch sensor layer TSP (see FIG. 1). For example, the touch driver TDV (or sensor driver) may supply a sensing signal to the touch sensor layer TSP, and be supplied with a user input signal obtained by sensing a user touch input. For example, as the user provides a touch input, a capacitance between sensing electrodes (see "CP" shown in FIG. 5) in the touch sensor layer TSP may be changed, and the touch driver TDV may determine a position of the user touch input, based on the change in the capacitance.

In some embodiments, the display area DA and a sensing area SA may overlap with each other. The sensing area SA may be an area capable of sensing a touch of the user. In addition, the fingerprint sensing area FA may overlap with the sensing area SA. In some embodiments, the non-display area NDA and a non-sensing area NSA may overlap with each other. Hereinafter, unless specifically mentioned otherwise, it may be interpreted that the display area DA and the sensing area SA are formed at positions corresponding to each other.

Figure 3:
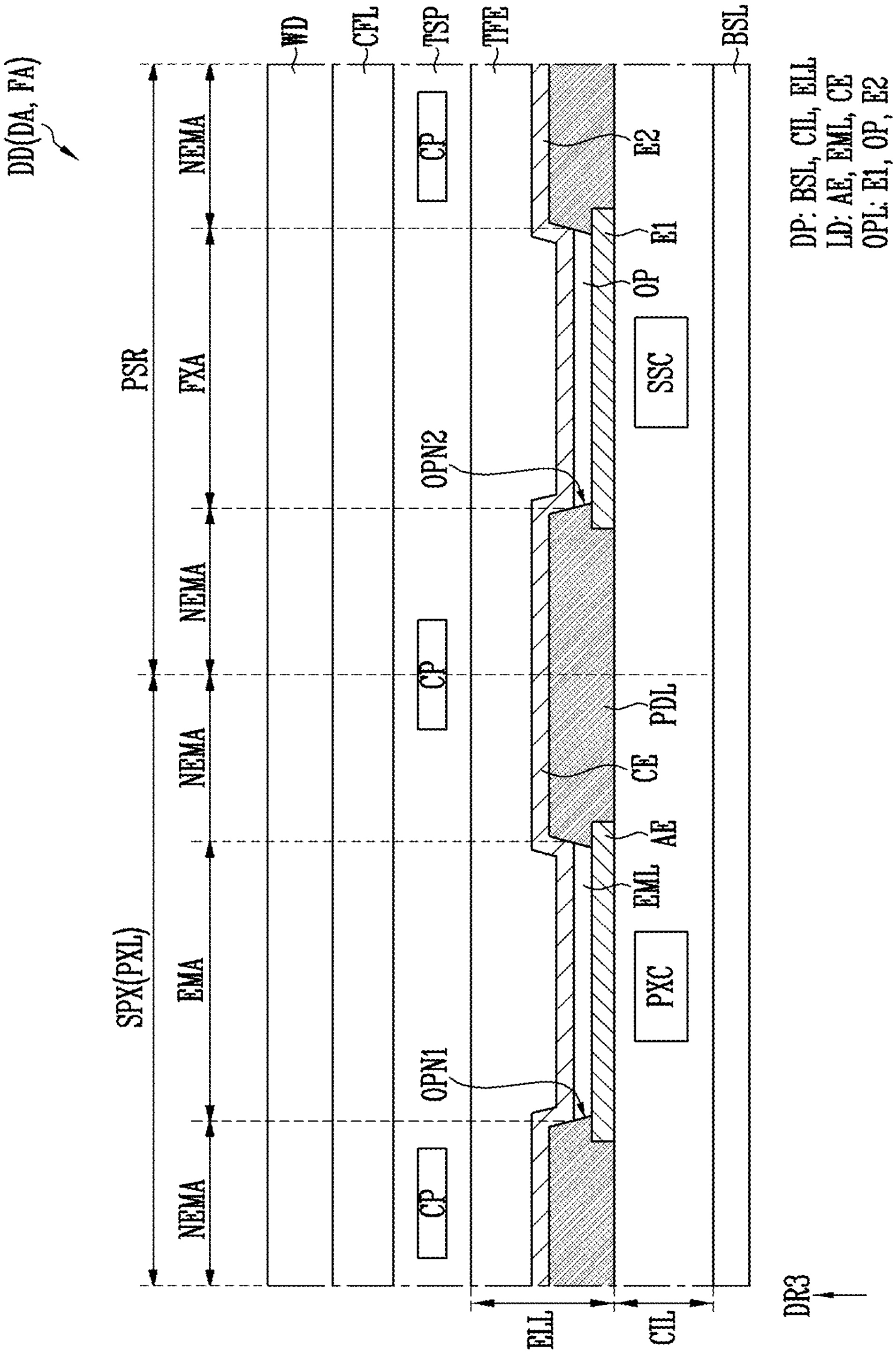
FIGS. 3 and 4 are schematic sectional views illustrating an embodiment of the display device shown in FIG. 2.
Figure 4:
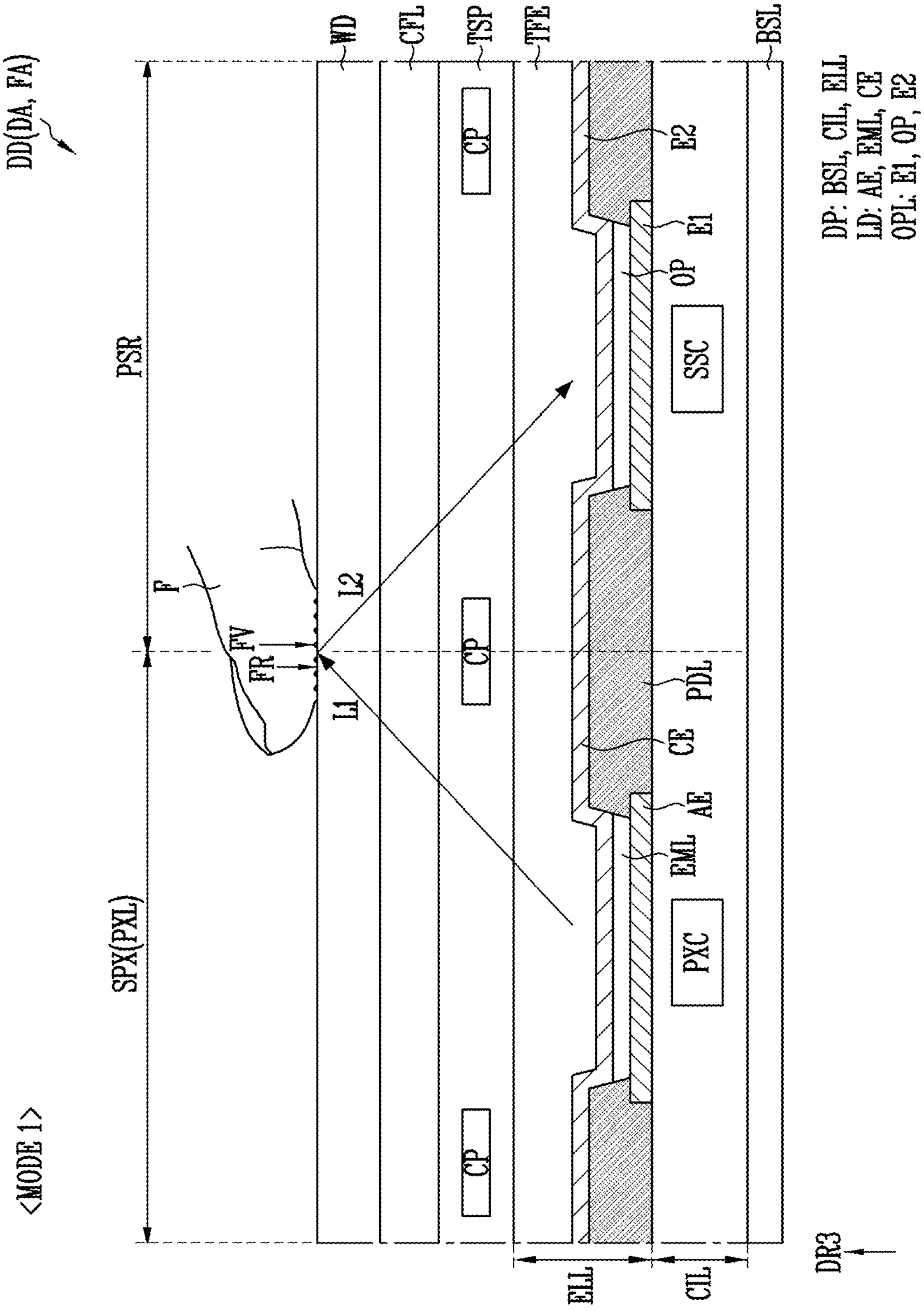

FIGS. 3 and 4 are schematic sectional views illustrating an embodiment of the display device shown in FIG. 2. In FIGS. 3 and 4, a sectional structure of the display device DD in the fingerprint sensing area FA included in the display area DA is schematically illustrated.

Referring to FIGS. 3 and 4, the display panel DP may include a light emitting element LD included in a pixel PXL (or sub-pixel SPX) and a light receiving element OPL included in a photo sensing element PSR.

In some embodiments, the pixel PXL may include an emission area EMA and a non-emission area NEMA adjacent to the emission area EMA. In some embodiments, the emission area EMA may be defined by a first opening OPN1 of a pixel defining layer PDL, in which a light emitting layer EML can be disposed. The emission area EMA may be an area in which light is emitted from the light emitting layer EML.

In some embodiments, the photo sensing pixel PSR may include a light receiving area FXA and the non-emission area NEMA adjacent to the light receiving area FXA. The light receiving area FXA may be defined by a second opening OPN2 of the pixel defining layer PDL, in which a light receiving layer OP can be disposed. The light receiving area FXA may be an area in which light to be sensed is applied to the light receiving layer OP.

In some embodiments, the display panel DP may include a circuit layer CIL on the base layer BSL and an element layer ELL on the circuit layer CIL.

The circuit layer CIL may include a pixel circuit PXC for driving the light emitting element LD and a sensor circuit SSC for driving the light receiving element OPL. The circuit layer CIL may include a semiconductor layer, a conductive layer, and an insulating layer, which are used to form the pixel circuit PXC and the sensor circuit SSC.

The element layer ELL may include the light emitting element LD and the light receiving element OPL, and include the pixel defining layer PDL and an encapsulation layer TFE, which are adjacent to the light emitting element LD and the light receiving element OPL.

The light emitting element LD may include an anode electrode AE, the light emitting layer EML, and a cathode electrode CE. The light emitting element LD may be an organic light emitting diode.

The anode electrode AE may be disposed on the circuit layer CIL, and be electrically connected to the pixel circuit PXC. The pixel defining layer PDL may cover a portion of the anode electrode AE, and expose a portion of a top surface of the anode electrode AE. The light emitting layer EML may be disposed on the anode electrode AE, and include a hole transport unit, a light emitting unit, and an electron transport unit. The cathode electrode CE may be disposed on the light emitting layer EML.

The light receiving element OPL may include a first light receiving electrode E1, the light receiving layer OP, and a second light receiving electrode E2. The light receiving element OPL may be a photo diode. However, the present disclosure is not necessarily limited thereto. The light receiving element OPL may be disposed in the same layer as the light emitting element LD.

The light receiving element OPL may be configured to acquire a sensing signal corresponding to light emitted from the light emitting element LD. The light receiving element OPL may sense light L2 reflected by a valley FV between ridges FR of a finger F of a user when a fingerprint input of the user is provided. An example will be described with reference to FIG. 4, the finger F of the user may be in contact with the window layer WD. The display device DD may drive fingerprint sensing in a first mode, light L1 output from the light emitting element LD may be reflected by the ridge FR and the valley FV of the finger F, and the reflected light L2 may reach the light receiving element OPL. A pattern of a user fingerprint may be recognized by distinguishing light L2 reflected from the ridge FR of the finger F from light L2 reflected from the valley FV of the finger F, based on a light amount. In some embodiments, a portion of the light L1 output from the light emitting element LD may be reflected while passing through skin and blood vessels, and the reflected light L2 may reach the light receiving element OPL. The amount of the reflected light L2 may vary according to flow of blood. Accordingly, a change in blood flow may be measured, and a heart rate, a blood pressure, or the like may be measured through analysis on the change in blood flow.

The first light receiving electrode E1 may be disposed on the circuit layer CIL, and be electrically connected to the sensor circuit SSC. The pixel defining layer PDL may cover a portion of the first light receiving electrode E1, and expose a portion of a top surface of the first light receiving electrode E1. The light receiving layer OP may be disposed on the first light receiving electrode E1, and include an electron blocking layer, a light receiving unit, and the like. The second light receiving electrode E2 may be disposed on the light receiving layer OP.

In some embodiments, the cathode electrode CE and the second light receiving electrode E2 may be patterned through the same process, and be integrally formed. The cathode electrode CE and the second light receiving electrode E2 may include a metal thin film or various transparent conductive materials. The anode electrode AE may include various conductive materials. The pixel defining layer PDL may include an organic material or an inorganic material.

The encapsulation layer TFE may disposed over the light emitting element LD and the light receiving element OPL, and encapsulate layers thereunder. The encapsulation layer TFE may include an organic layer or an inorganic layer, but the present disclosure is not limited to a specific example.

A touch sensor layer TSP may be disposed on the display panel DP, and a color filter layer CFL and the window layer WD may be disposed on the touch sensor layer TSP.

The touch sensor layer TSP may include a conductive pattern CP. The conductive pattern CP may be disposed at the periphery of the emission area EMA and the light receiving area FXA. For example, the conductive pattern CP may be in the non-emission area NEMA. When viewed on a plane, the conductive pattern CP may overlap with the pixel defining layer PDL. In some embodiments, the conductive pattern CP may have a mesh structure surrounding each of the emission area EMA and the light receiving area FXA.

The color filter layer CFL may include a color filter. For example, the color filter may include a color filter material (e.g., a pigment or a dye) which allows light of a specific color (e.g., red, green or blue) to be selectively transmitted therethrough. Light of a first color, which the light emitting element LD of the sub-pixel SPX provides, may be provided to the outside while being transmitted through the color filter.

In some embodiments, the non-emission area NEMA in which light of one color is not to be viewed may be formed between emission areas EMA. In some embodiments, color filters of different colors overlap with each other when viewed on a plane in the non-emission area NEMA, thereby forming a light blocking pattern.

Figure 5:
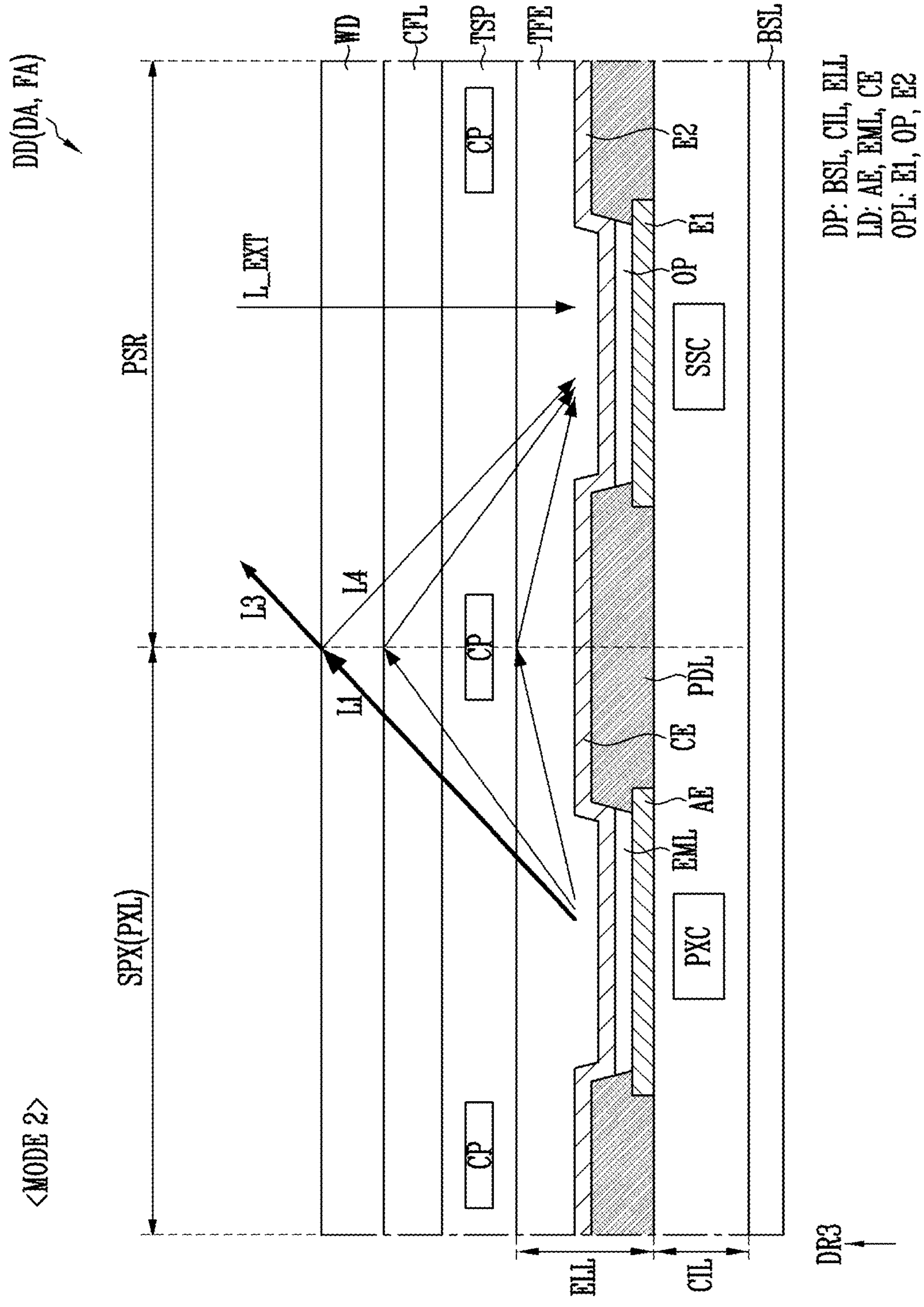
FIGS. 5 and 6 are sectional views illustrating an operation of the display device shown in FIG. 2.
Figure 6:
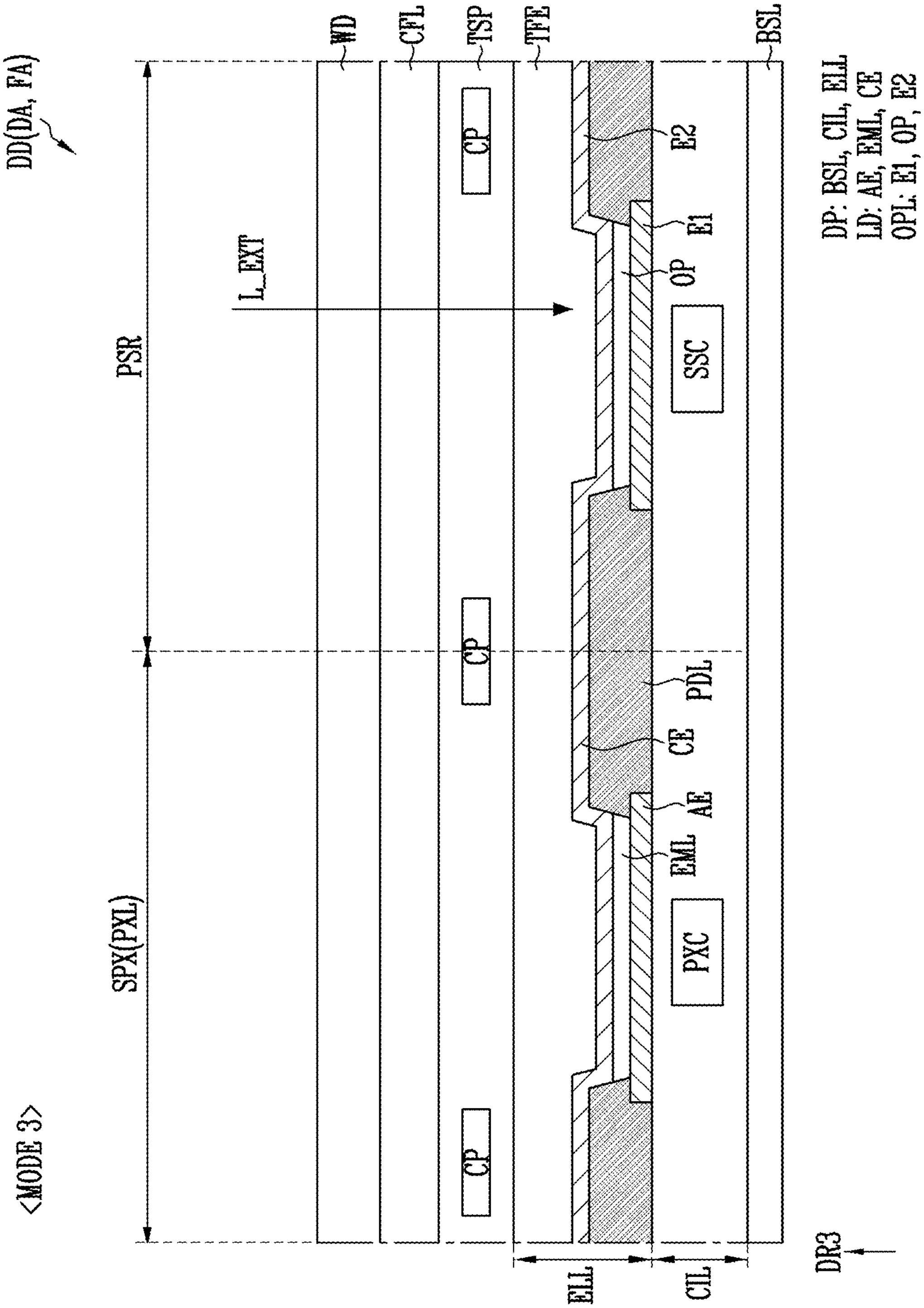
Figure 7:
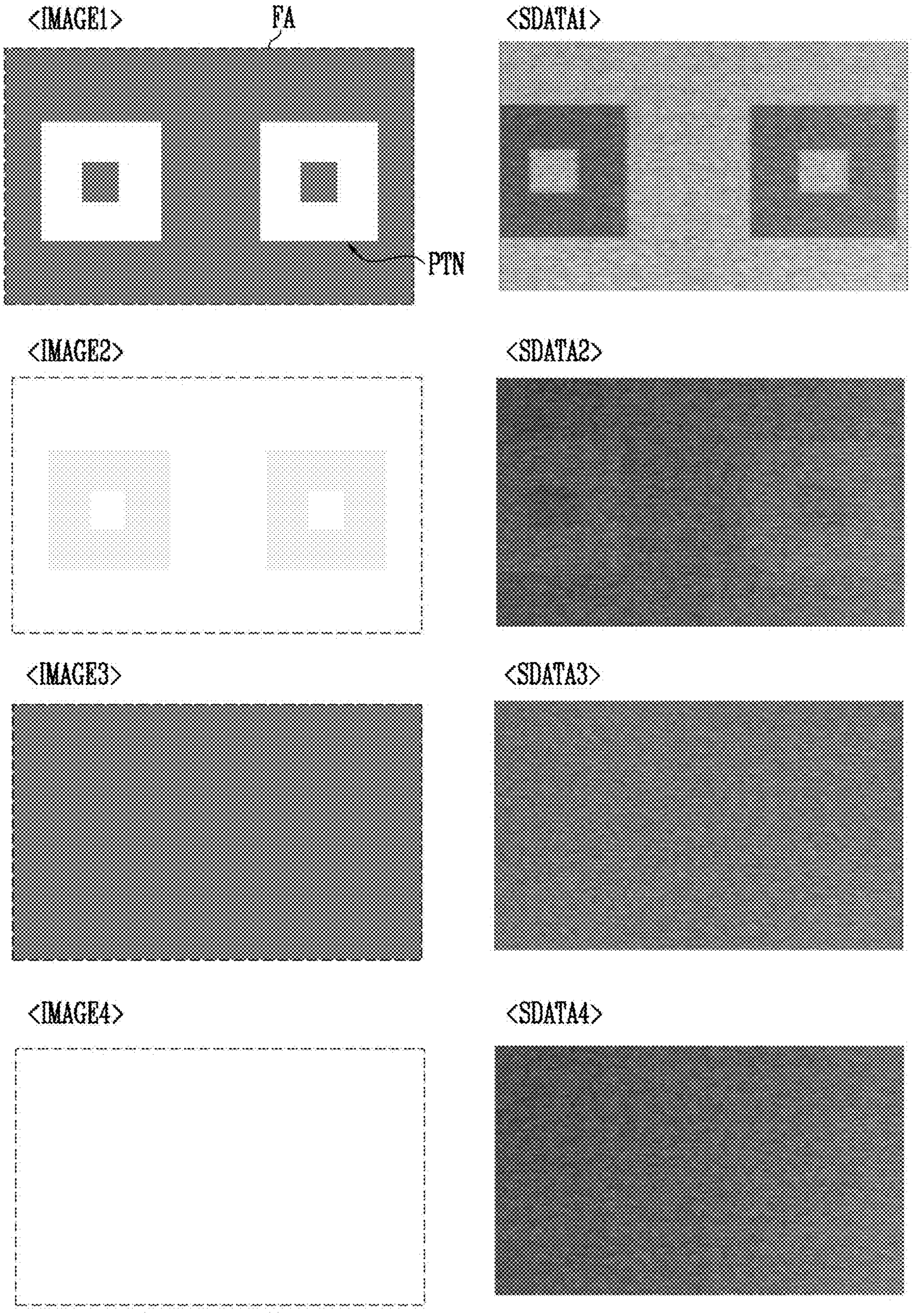
FIG. 7 is a view illustrating images displayed in the display device shown in FIG. 2 and sensing data acquired corresponding to the images.

FIGS. 5 and 6 are sectional views illustrating an operation of the display device shown in FIG. 2. In FIG. 5, an operation of the display device DD in a second mode for acquiring degradation data is illustrated. In FIG. 6, an operation of the display device DD in a third mode for acquiring reference data is illustrated. FIG. 7 is a view illustrating images displayed in the display device shown in FIG. 2 and sensing data acquired corresponding to the images.

First, referring to FIGS. 2, 4, and 7, a first image IMAGE1 is displayed in the display device DD in the first mode for fingerprint sensing. In the image, a bright portion represents a high luminance, and a dark portion represents a low luminance. First sensing data SDATA1 is an electrical signal (or sensing signal) or data, which is received from photo sensing pixels PSR, corresponding to the first image IMAGE1. In the data (or sensing data), a dark portion represents a large light amount, and a bright portion represents a small light amount.

In the first mode, a pattern PTN may be displayed in the fingerprint sensing area FA of the display device DD. For example, the pattern PTN may have a quadrangular planar shape, but the present disclosure is not limited thereto. A sub-pixel SPX located in an area corresponding to the pattern PTN may emit light with a maximum luminance (or high luminance) (e.g., a full white luminance) corresponding to a minimum grayscale, or may not emit light.

When the display device DD repeatedly and continuously operates in the first mode, the sub-pixel SPX may be degraded. When a normal image is displayed, image quality degradation in the area may be viewed while the sub-pixel SPX located in the area corresponding to the pattern PTN does not emit light with a desired luminance.

A second image IMAGE2 is displayed in the display device DD in the second mode for acquiring degradation data, and second sensing data SDATA2 is an electrical signal or data, which is received from the photo sensing pixels PSR, corresponding to the second image IMAGE2. That is, the second sensing data SDATA2 may be degradation data.

Referring to FIG. 5, in the second mode, the light emitting element LD of a sub-pixel SPX may emit light L1. Of light L1, light L3 may be emitted to the outside. However, light L4 of the light L1 may be reflected or refracted inside the display device DD, to be incident onto or reach a photo sensing pixel PSR adjacent to the sub-pixel SPX. For example, the light L4 may be reflected at an interface between the encapsulation layer TFE and the touch sensor layer TSP, may be reflected at an interface between the color filter layer CFL and the window layer WD, or may be reflected at a top surface of the window layer WD. The light L4 may be incident onto only the photo sensing pixel PSR immediately adjacent to the sub-pixel SPX. A general display device may include a color mixture prevention structure between a sub-pixel SPX and another sub-pixel SPX such that light emitted from the sub-pixel SPX is not introduced to the other sub-pixel SPX. By the color mixture prevention structure, the light L4 does not progress to the other sub-pixel SPX, but may progress only to the photo sensing pixel PSR immediately adjacent to the sub-pixel SPX.

For example, the light L3 emitted to the outside may be about 80% to about 90% of the light L1 output from the light emitting element LD, and the light L4 incident onto the photo sensing pixel PSR may be about 10% to about 20% of the light L1 output from the light emitting element LD. A ratio of the light L4 to the light L1 may be fixed and unchanged. By considering the amount of the light L4, the sub-pixel SPX in the second mode may be emitting light with a maximum luminance (or high luminance) corresponding to a maximum grayscale.

When the sub-pixel SPX is degraded, the amount of the light L1 may become small, and the amount of the light L4 may also become small. That is, the second sensing data SDATA2 may include degradation information of the sub-pixel SPX. An example will be described with reference to FIG. 7. Although a full white image is displayed in the entire area of the display device DD, a maximum luminance in the area corresponding to the pattern PTN may be represented low in the second image IMAGE2, and a portion at which light amount is insufficient may be represented in the second sensing data SDATA2.

In the second mode, external light may be incident onto the photo sensing circuit PSR in addition to the light L4.

A display surface of the display device DD is covered using an arbitrary object, so that the external light L_EXT can be prevented from incident onto the photo sensing pixel PSR. However, light emitted from the light emitting element LD may be reflected by the object to be incident onto the photo sensing pixel PSR, and the reflected light may not be uniform according to a color or a surface characteristic of the object. Further, as the path of the reflected light is lengthened, the reflected light may be incident onto not only the photo sensing pixel PSR adjacent to the sub-pixel SPX but also another photo sensing pixel PSR. That is, an object exists on the display surface, it may be more difficult or complicated to calculate a degradation degree of the sub-pixel SPX. Moreover, that an object is disposed to cover the display surface of the display device DD is an operation which the display device DD cannot perform, and it is not ensured whether a state in which the object is disposed is the same condition (e.g., the same object, the same separation distance, or the like). By considering this, when no object exists on the display surface of the display device DD, the display device DD, the display device DD may operate in the second mode (and the third mode). For example, the touch driver TDV may determine whether a touch input on the display device DD exists or whether an object exists within a reference distance in the third direction DR3 from the display surface of the display surface, and the fingerprint detector FPDP may acquire second sensing data SDATA2 in the second mode in response to information that no touch input or no object exists, which is determined by the touch driver TDV. When an object exists on the display surface of the display device DD, the display device DD does not operate in the second mode (and the third mode).

In order to acquire reference data for excluding a component (and a noise component) caused by the external light L_EXT, the display device DD may operate in the third mode.

Referring to FIG. 7, a third image IMAGE3 is displayed in the display device DD in the third mode for acquiring reference data, and third sensing data SDATA3 is an electrical signal or data, which is received from the photo sensing pixels PSR, corresponding to the third image IMAGE3.

Referring to FIG. 6, the sub-pixel SPX may not emit light in the third mode. External light L_EXT may be incident onto the photo sensing pixel PSR. The third image IMAGE3 may be a substantially black image as the sub-pixel SPX does not emit light. The third sensing data SDATA3 may include a remaining component (or noise component) of the second sensing data SDATA2 (e.g., an error caused by a characteristic variation or non-uniformity of the photo sensing pixel PSR in addition to the external light L_EXT).

The driving circuit DCP may calculate a compensation value for compensating degradation of the sub-pixel SPX, based on the second sensing data SDATA2 and the third sensing data SDATA3.

For example, the driving circuit DCP (or the panel driver PNDP) may acquire differential data by performing a subtraction operation on the second sensing data SDATA2 and the third sensing data SDATA3, calculate a degradation degree of the sub-pixel SPX by comparing the differential data and baseline data, and calculate a compensation value, based on the degradation degree. The baseline data may be one (e.g., a maximum value) of values in the second sensing data SDATA2 or the differential data, or data including an average value of the values. Alternatively, the baseline data may be differential data generated before the sub-pixel SPX is degraded, e.g., just after the display device DD is manufactured. That is, the baseline data may be pre-set or pre-stored.

When the subtraction operation is performed on the second sensing data SDATA2 and the third sensing data SDATA3, the noise component of the second sensing SDATA2 is eliminated, and therefore, the differential data may include only a component corresponding to the light L4 shown in FIG. 5. A degree to which the light amount (or luminance) of the light L4 is decreased may be calculated by comparing the baseline data and the differential data, and the decreased light amount may represent a degradation degree of the sub-pixel SPX. For example, when the light amount (or luminance) is decreased by about 10%, the driving circuit DCP may determine that the sub-pixel SPX has been degraded by about 10%. The driving circuit DCP may calculate a compensation value for compensating for the decreased light amount (or luminance). For example, the driving circuit DCP may determine, as the compensation value, a difference or ratio between a grayscale value for a luminance increased by about 10% and a grayscale value for a current luminance. The driving circuit DCP may allow the sub-pixel SPX to emit light with a target luminance by reflecting (e.g., an addition operation, a multiplication operation, or the like) the compensation value on a grayscale value of the sub-pixel SPX in image data.

A fourth image IMAGE4 (e.g., a full white image) is displayed in the display device DD, based on image data on which the compensation value is reflected, and fourth sensing data SDATA4 is an electrical signal or data, which is received from the photo sensing pixels PSR, corresponding to the fourth image IMAGE4. No degradation may be viewed in the fourth image IMAGE4 and the fourth sensing data SDATA4.

In an embodiment, the driving circuit DCP may calculate an illuminance (or luminance, brightness), and determine whether the illuminance is smaller than a reference value. The driving circuit DCP may acquire the second sensing data SDATA2 through the second mode when the illuminance is smaller than the reference value, and may not acquire the second sensing data SDATA2 when the illuminance is greater than or equal to the reference value.

When the light amount of the external light L_EXT is large or when the luminance of the external light L_EXT is high, it may be difficult to detect the light L4 shown in FIG. 5. By considering this, the reference value may be set. The display device DD may perform an operation for degradation compensation (e.g., the second mode) only when the illuminance is smaller than the reference value, using the photo sensing pixel PSR as an illuminance sensor.

As described above, in a state in which no object exists on the display surface of the display device, the second sensing data SDATA2 may be acquired by allowing the sub-pixel SPX to light and allowing the photo sensing pixel PXR to operate, the third sensing data SDATA3 may be acquired by allowing the sub-pixel SPX not to emit light and allowing the photo sensing pixel PSR to operate, and a degradation degree of the sub-pixel SPX may be calculated based on the second sensing data SDATA2 and the SDATA. Since the degradation degree of the sub-pixel SPX is not predicted by accumulating image data, but light (or degradation degree) of the sub-pixel SPX is directly measured using the photo sensing pixel PSR, degradation compensation can be more accurately performed, and display quality can be improved.

Light may be measured at the outside of the display device DD, using a separate device (e.g., a camera). However, the separate device is a component separate from the display device DD, and cost of the display device DD may be increased by the separate device. Since the display device DD in accordance with the embodiments of the present disclosure additionally has no separate device for measuring light of the sub-pixel SPX, the cost of the display device is not increased. In order to distinguish degradation compensation in accordance with the embodiments of the present disclosure with degradation compensation using an external separate device, an operation of performing degradation compensation, using the photo sensing pixel PSR in accordance with the embodiments of the present disclosure, may be referred to as a self-degradation compensation.

In FIGS. 5 to 7, it has been described that degradation of the sub-pixel SPX, which occurs as the display device DD repeatedly and continuously operates in the first mode, is compensated. However, the present disclosure is not limited thereto. For example, even when the display device DD operates in a normal mode (or display mode) in which a normal image is displayed, instead of the first mode (or sensing mode), a specific image (e.g., an icon, a logo, or the like) may be continuously displayed in a specific area, and a sub-pixel SPX of the specific area may be degraded. In the embodiments shown in FIGS. 5 to 7, various degradations (or image quality degradation), occurring in the first mode, the normal, and the like, can be compensated.

Figure 8:
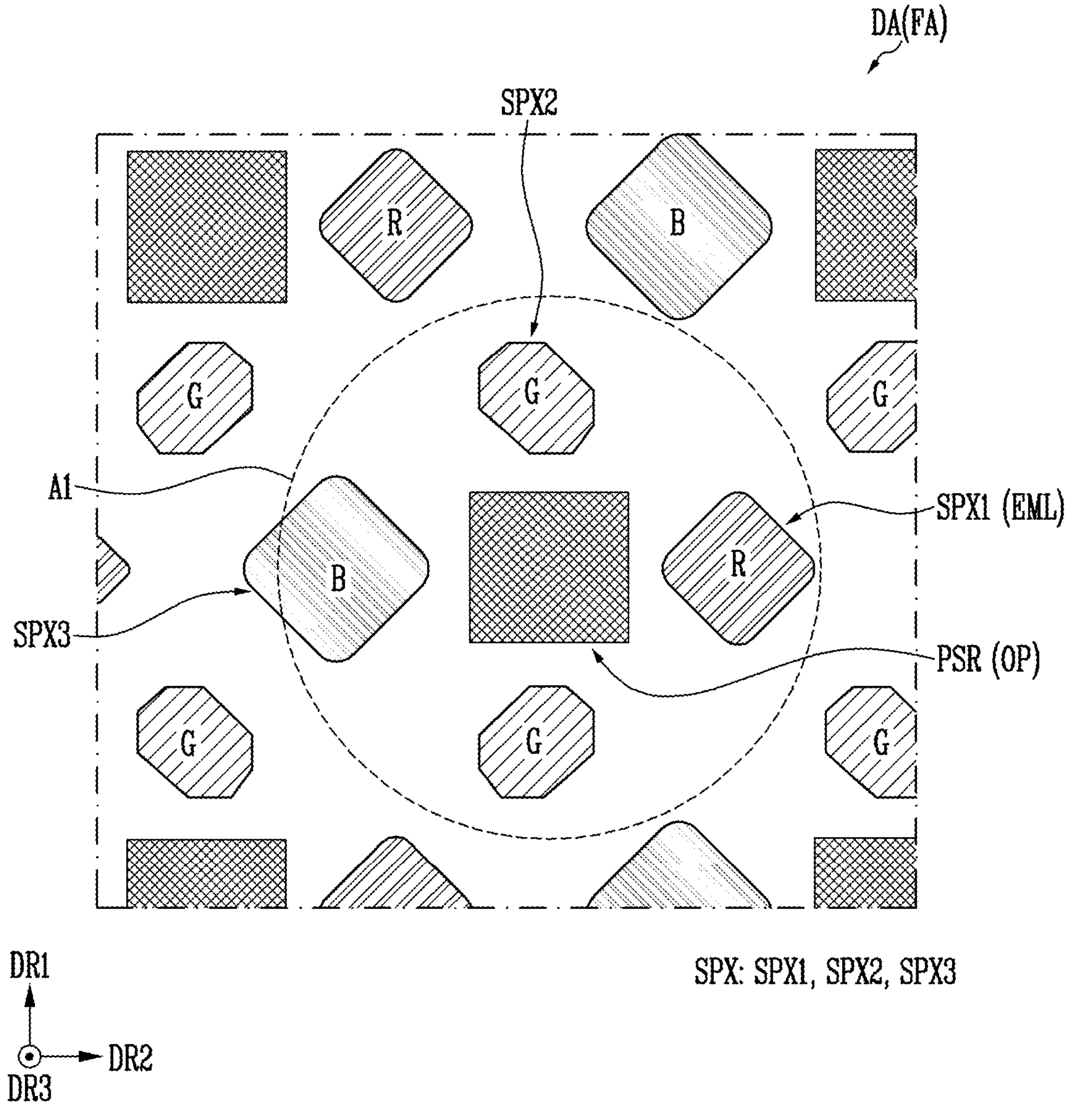
FIG. 8 is a schematic plan view illustrating an embodiment of the display device shown in FIG. 2.

FIG. 8 is a schematic plan view illustrating an embodiment of the display device shown in FIG. 2.

Referring to FIG. 8, sub-pixels SPX (or pixel) may include a first sub-pixel SPX1, a second sub-pixel SPX2, and a third sub-pixel SPX3. The first sub-pixel SPX1 may provide light of a first color (e.g., red R), the second sub-pixel SPX2 may provide light of a second color (e.g., green G), and the third sub-pixel SPX3 may provide light of a third color (e.g., blue B).

In some embodiments, in FIG. 8, it is illustrated that the first to third sub-pixels SPX1 to SPX3 are arranged in a PENTILE® arrangement structure. However, the present disclosure is not limited thereto.

In some embodiments, a position of the sub-pixel SPX may correspond to the emission area EMA or the light emitting layer EML, in which light is provided from the corresponding light emitting element LD shown in FIG. 3. A position of a photo sensing pixel PSR may correspond to the light receiving area FXA or the light receiving layer OP, in which the corresponding light receiving element OPL shown in FIG. 5 receives light.

In some embodiments, since a fingerprint sensing area FA is formed in a display area DA, the sub-pixel SPX and the photo sensing pixel PSR may be arranged in one area. When viewed on a plane, the first to third sub-pixels SPX1 to SPX3 may be disposed at the periphery of the photo sensing pixel PSR, e.g., in a first area A1 which is within a specific distance with respect to the photo sensing pixel PSR. Accordingly, lights provided by the first to third sux-pixels SPX1 to SPX3 in the first area A1 may be provided to the photo sensing pixel SPR in the first area A1. As described above, by the color mixture prevention structure or the like, the lights provided by the first to third sub-pixels SPX1 and SPX3 in the first area A1 do not progress up to photo sensing pixels PSR outside the first area A1, but may progress up to the photo sensing pixels PSR in the first area A1.

In an embodiment, the display device DD may acquire the second sensing data SDATA2 in the second mode by allowing only one of the first to third sub-pixels SPX1 to SPX3 to emit light, and calculate a compensation value for one of the first to third sub-pixels SPX1 to SPX3, based on the second sensing data SDATA2.

When the first to third sub-pixels SP1 to SP3 are individually driven, degradation degrees of the first to third sub-pixels SP1 to SP3 may be individually measured, and accordingly, degradation compensation on the first to third sub-pixels SP1 to SP3 can be accurately performed.

Figure 9:
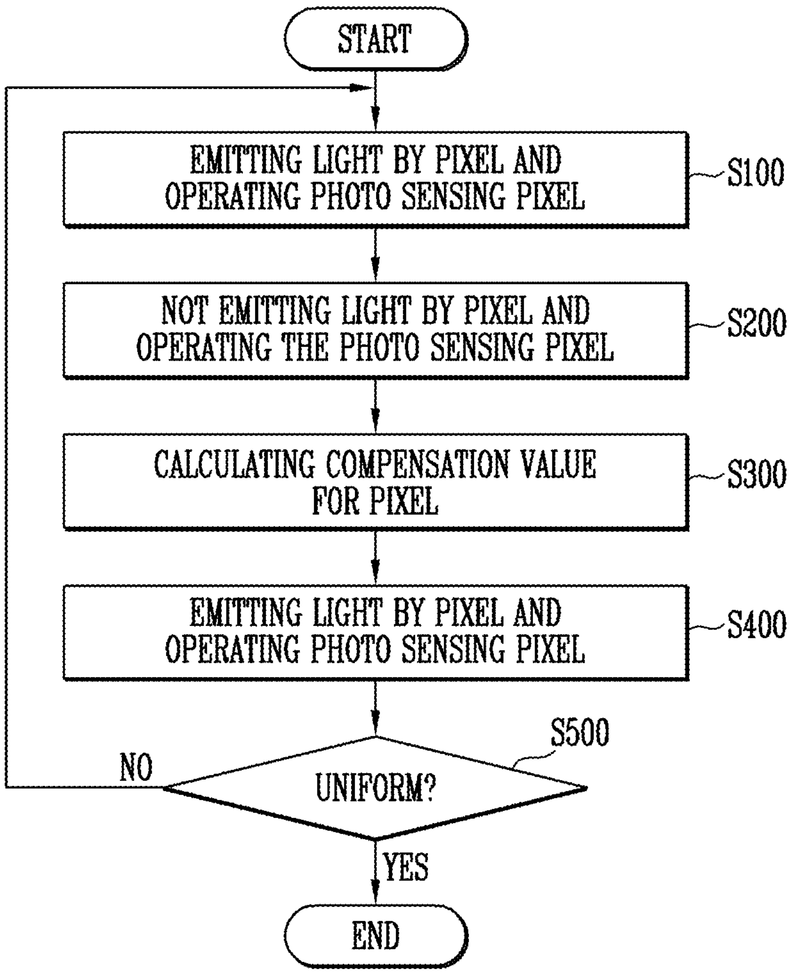
FIG. 9 is a flowchart illustrating a method of driving a display device in accordance with embodiments of the present disclosure.

FIG. 9 is a flowchart illustrating a method of driving a display device in accordance with embodiments of the present disclosure.

Referring to FIGS. 1, 2, and 9, the method shown in FIG. 9 may be performed in the display device DD shown in FIGS. 1 and 2.

The method shown in FIG. 9 may perform a first sensing operation of emitting light by the pixel PXL (or the sub-pixel SPX) and operating the photo sensing pixel PSR (S100). That is, the display device DD may operate in the second mode described with reference to FIG. 5. The display device DD may acquire the second sensing data SDATA2 described with reference to FIG. 7 according to the first sensing operation.

In the step S100, the pixel PXL may emit light with a maximum brightness. Also, in the step S100, the pixel PXL may emit light in a whole of the display area DA (or a whole of the display surface of the display device DD). Based on this, image quality degradation can be compensated in the whole of the display area DA.

The method shown in FIG. 9 may perform a second sensing operation of not emitting light by the pixel PXL and operating the photo sensing pixel PSR (S200). That is, the display device DD may operate in the third mode described with reference to FIG. 6. The display device DD may acquire the third sensing data SDATA described with reference to FIG. 7 according to the second sensing operation.

The second sensing operation may be performed after the first sensing operation, but the present disclosure is not limited thereto. For example, the second sensing operation may be performed first, and the first sensing operation may be performed after the second sensing operation is performed.

After that, the method shown in FIG. 9 may compensate for degradation of the pixel PXL, based on the second sensing data SDATA2 and the third sensing data SDATA3.

In an embodiment, the method shown in FIG. 9 may calculate a compensation value for compensating the degradation of the pixel PXL, based on the second sensing data SDATA2 and the third sensing data SDATA3 (S300).

For example, the method shown in FIG. 9 may acquire differential data by performing a subtraction operation on the second sensing data SDATA2 and the third sensing data SDATA3, calculate a degradation degree of the pixel PXL based on comparing the differential data and baseline data, and calculate a compensation value based on the degradation degree. The baseline data may be a value (e.g., a maximum value) of the second sensing data SDATA2 or the differential data, or the baseline data may be an average value of the second sensing data SDATA2 or the differential data. Alternatively, the baseline data may be differential data generated before the pixel PXL is degraded, e.g., just after the display device DD is manufactured. That is, the baseline data may be pre-set or pre-stored.

In an embodiment, the method shown in FIG. 9 may perform a third sensing operation of emitting light by the pixel PXL and operating the photo sensing pixel PSR by reflecting the compensation value on image data (S400). Similarly to the first sensing operation, the display device DD may acquire the fourth sensing data SDATA4 described with reference to FIG. 7.

The method shown in FIG. 9 may determine whether values in the fourth sensing data SDATA4 are uniform (S500). For example, when the values in the fourth sensing data SDATA4 are uniform, the method shown in FIG. 9 may determine that degradation compensation has been successfully performed. In another example, when the values in the fourth sensing data SDATA4 are not uniform, the method shown in FIG. 9 may determine that the degradation compensation has not been successfully performed. For example, the method shown in FIG. 9 may repeat the step S100 of performing the first sensing operation, the step S200 of performing the second sensing operation, and the step S300 of calculating the compensation value. For example, the method shown in FIG. 9 may repeat the step S100 of performing the first sensing operation, the step S200 of performing the second sensing operation, and the step S300 of calculating the compensation value until the values in the fourth sensing data SDATA4 become uniform or until it is determined that the degradation compensation has been successfully performed.

In an embodiment, the pixel PXL may include sub-pixels SPX emitting lights of different colors, and the method shown in FIG. 9 may performing the first sensing operation by allowing only one of the sub-pixels SPX (or sub-pixels SPX corresponding to one color among the sub-pixels SPX) to emit light. An example will be described with reference to FIG. 8. The method shown in FIG. 9 may perform the first sensing operation, using only a first sub-pixel SPX1 emitting light of a first color (e.g. red R). The method shown in FIG. 9 may acquire a compensation value for the first sub-pixel SPX1, based on the second sensing data SDATA2 according to the first sensing operation. Similarly, the method shown in FIG. 9 may acquire a compensation value for a second sub-pixel SPX2 emitting light of a second color (e.g., green G) by performing the first sensing operation, using only the second sub-pixel SPX2, and acquire a compensation value for a third sub-pixel SPX3 emitting light of a third color (e.g., blue B) by performing the first sensing operation, using only the third sub-pixel SPX3.

As described above, the second sensing data SDATA2 may be acquired by performing the first sensing operation of emitting light by the pixel PXL and operating the photo sensing pixel PSR, the third sensing data SDATA3 may be acquired by performing the second sensing operation of not emitting light by the pixel PSL and operating the photo sensing pixel PSR, and the degradation degree of the pixel PXL may be calculated based on the second sensing data SDATA2 and the third sensing data SDATA3. Since the degradation degree of the pixel PXL is not predicted by accumulating image data, but light (or degradation degree) of the pixel PXL is directly measured using the photo sensing pixel PSR, the degradation compensation can be more accurately performed, and the display quality can be improved.

Figure 10:
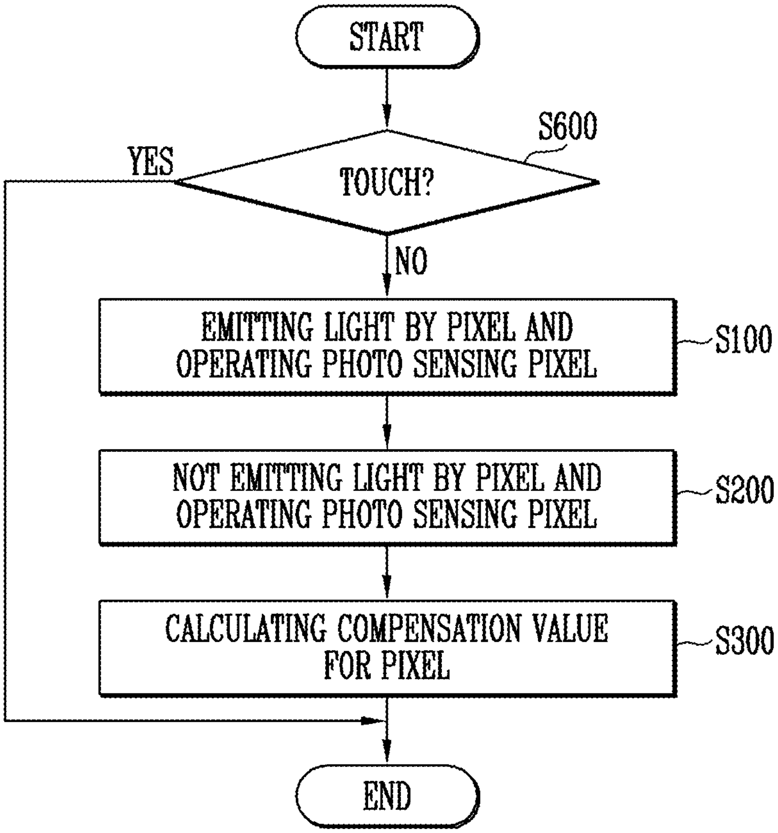
FIG. 10 is a flowchart illustrating a method of driving a display device in accordance with an embodiment of the present disclosure.

FIG. 10 is a flowchart illustrating a method of driving a display device in accordance with an embodiment of the present disclosure.

Referring to FIGS. 9 and 10, the method shown in 10 may determine whether an object exists on the display surface of the display device DD, using the touch sensor layer TSP (see FIG. 1 or FIG. 5) (or touch sensor), before the step S100 of performing the first sensing operation and before the step S200 of performing the second sensing operation (S600).

The method shown in FIG. 10 may perform the first sensing operation when on object exists on the display surface (S100).

Alternatively, the method shown in FIG. 10 may not perform the first sensing operation when no object exists on the display surface. As described with reference to FIG. 5, this is because it becomes more difficult or complicated to calculated the degradation degree when no object exists on the display surface.

Since the pixel PXL does not emit light when the second sensing operation is performed, it is not important whether an object exists on the display surface. However, by considering that the second sensing operation is used to eliminate noise in the first sensing operation (i.e., noise generated in an environmental condition in which the first sensing operation is performed), the second sensing operation may be performed when no object exists on the display surface (S200).

After that, the method shown in FIG. 10 may compensate for degradation of the pixel PXL, based on the second sensing data SDATA2 and the third sensing data SDATA3 (S300).

The embodiment shown in FIG. 10 may be applied to the embodiment shown in FIG. 9. For example, as described with reference to FIG. 9, the method shown in FIG. 10 may perform the third sensing operation of emitting light by the pixel PXL and operating the photo sensing pixel PSR by reflecting the compensation value on the image data (S400) and determine whether the values in the fourth sensing data SDATA4 are uniform (S500). Also, the method shown in FIG. 10 may repeat the step S600 of determining whether the object exists on the display surface, the step S100 of performing the first sensing operation, the step S200 of performing the second sensing operation, and the step S300 of calculating the compensation value until the values in the fourth sensing data SDATA4 become uniform or until it is determined that the degradation compensation has been successfully performed.

Figure 11:
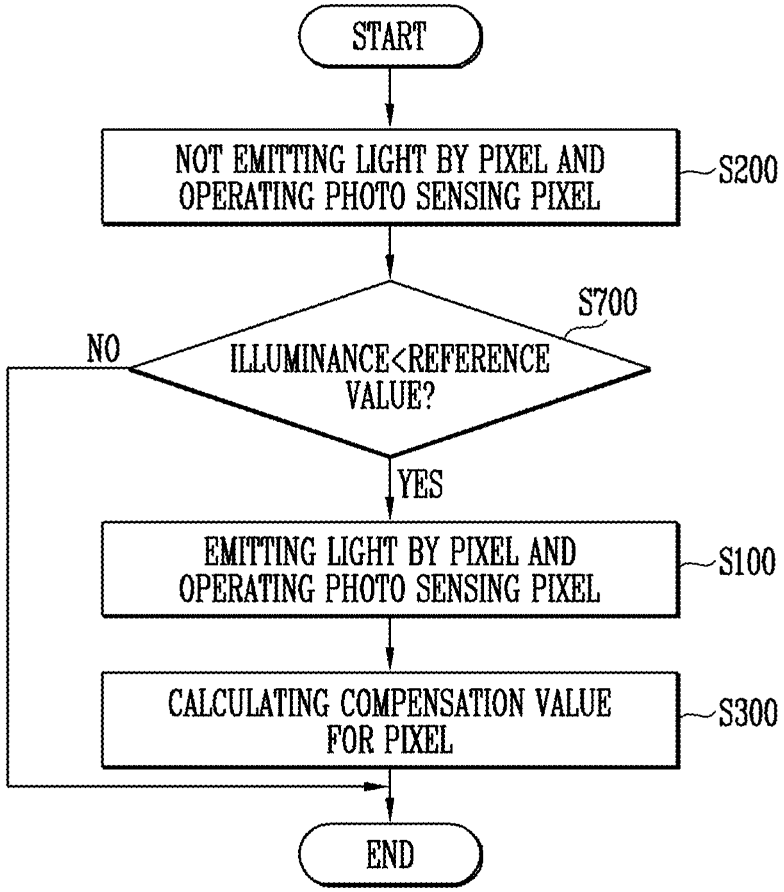
FIG. 11 is a flowchart illustrating a method of driving a display device in accordance with an embodiment of the present disclosure.

FIG. 11 is a flowchart illustrating a method of driving a display device in accordance with an embodiment of the present disclosure.

Referring to FIGS. 9 and 11, the method shown in FIG. 11 may perform the second sensing operation of not emitting light by the pixel PXL (or the sub-pixel SPX) and operating the photo sensing pixel PSR (S200). The display device DD may acquire the third sensing data SDATA3 described with reference to FIG. 7 according to the second sensing operation.

After that, the method shown in FIG. 11 may calculate an illuminance, based on the third sensing data SDATA3, and determine whether the illuminance is smaller than a reference value (S700).

When the illuminance is smaller than the reference value, the method shown in FIG. 11 may perform the first sensing operation of emitting light by the pixel PXL and operating the photo sensing pixel PSR (S100). The display device DD may acquire the second sensing data SDATA2 described with reference to FIG. 7 according to the first sensing operation, and calculate a compensation value for compensating for degradation of the pixel PXL, based on the third sensing data SDATA3 (S300).

Alternatively, when the illuminance is greater than or equal to the reference value, the method shown in FIG. 11 may not perform the first sensing operation. This is because, as described with reference to FIG. 6, when the light amount of the external light L_EXT is large or when the luminance of the external light L_EXT is high, it may be difficult to detect the light L4 shown in FIG. 5.

The embodiment shown in FIG. 11 may be applied to the embodiment shown in FIG. 9. For example, as described with reference to FIG. 9, the method shown in FIG. 11 may perform the third sensing operation of emitting light by the pixel PXL and operating the photo sensing pixel PSR by reflecting the compensation value on the image data (S400) and determine whether the values in the fourth sensing data SDATA4 are uniform (S500). Also, the method shown in FIG. 11 may repeat the step S200 of performing the second sensing operation, the step S700 of determining whether the illuminance is smaller than the reference value, the step S100 of performing the first sensing operation, and the step S300 of calculating the compensation value until the values in the fourth sensing data SDATA4 become uniform or until it is determined that the degradation compensation has been successfully performed.

The embodiment shown in FIG. 10 may be applied to the embodiment shown in FIG. 11. For example, the method shown in FIG. 11 may determine whether an object exist on the display surface of the display device DD, when the illuminance is smaller than the reference value (S600) (see FIG. 10), and perform the first sensing operation when no object exits on the display surface (S100).

Figure 12:
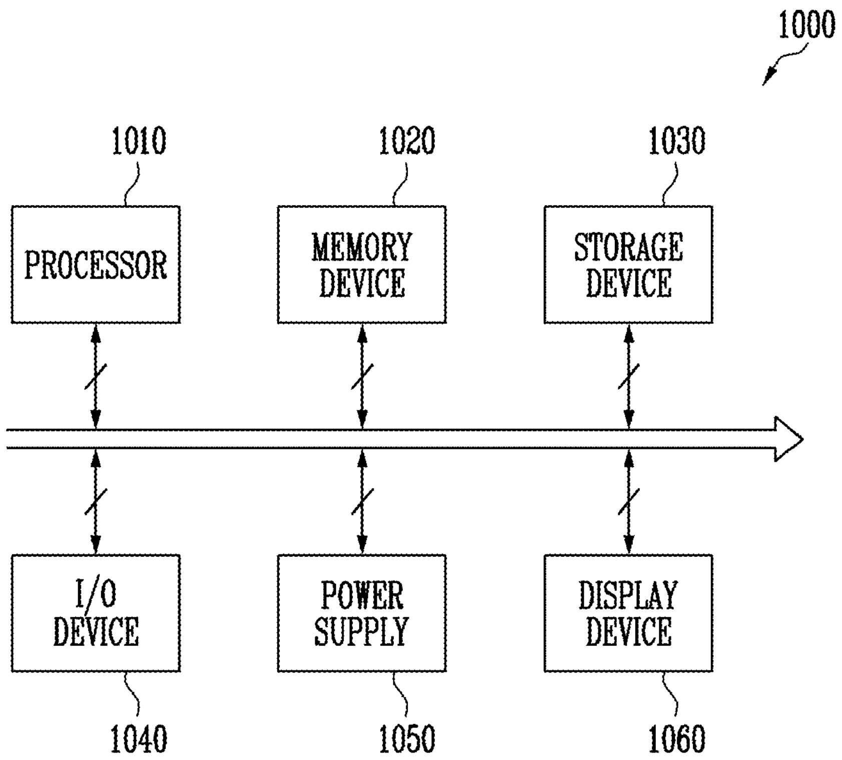
FIG. 12 is a schematic block diagram illustrating an electronic device including a display device in accordance with an embodiment of the present disclosure.
Figure 13:
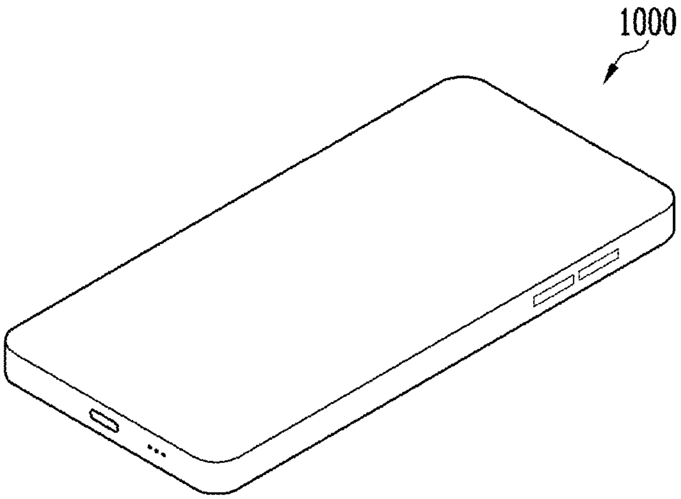
FIG. 13 is a schematic view illustrating an example in which the electronic device shown in FIG. 12 is implemented as a smartphone.
Figure 14:
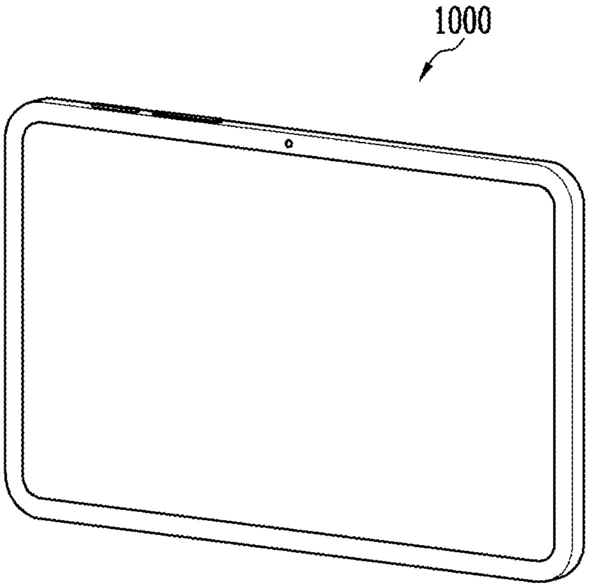
FIG. 14 is a schematic view illustrating an example in which the electronic device shown in FIG. 12 is implemented as a tablet PC.

FIG. 12 is a schematic block diagram illustrating an electronic device including a display device in accordance with an embodiment of the present disclosure. FIG. 13 is a schematic view illustrating an example in which the electronic device shown in FIG. 12 is implemented as a smartphone. FIG. 14 is a schematic view illustrating an example in which the electronic device shown in FIG. 12 is implemented as a tablet PC.

Referring to FIGS. 12 to 14, the electronic device 1000 may include a processor 1010, a memory device 1020, a storage device 1030, an input/output (I/O) device 1040, a power supply 1050, and a display device 1060. The display device 1060 may be the display device DD described above. Also, the electronic device 1000 may further include several ports capable of communicating with a video card, a sound card, a memory card, a USB device, and the like, or communicating with other systems. In an embodiment, as shown in FIG. 13, the electronic device 1000 may be implemented as a smartphone. In another embodiment, as shown in FIG. 14, the electronic device 1000 may be implemented as a tablet PC. However, this is merely illustrative, and the electronic device 1000 is not limited thereto. For example, the electronic device 1000 may be implemented as a mobile phone, a video phone, a smart pad, a smart watch, a vehicle navigation system, a computer monitor, a notebook computer, a head mounted display device, or the like.

The processor 1010 may perform specific calculations or tasks. In some embodiments, the processor 1010 may be a microprocessor, a central processing unit, an application processor, or the like. The processor 1010 may be connected to other components through an address bus, a control bus, a data bus, and the like. In some embodiments, the processor 1010 may be connected to an extension bus such as a peripheral component interconnect (PCI) bus. In some embodiments, the processor 1010 may provide input image data to the display device 1060, and accordingly, the display device 1060 may display an image, based on the input image data provided from the processor 1010.

The memory device 1020 may store data necessary for an operation of the electronic device 1000. For example, the memory device 1020 may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, or a Ferroelectric Random Access Memory (FRAM) device, or a volatile memory device such as a Dynamic Random Access Memory (DRAM) device, a Static Random Access Memory (SRAM) device, or a mobile DRAM device.

The storage device 1030 may include a Solid State Drive (SSD), a Hard Disk Drive (HDD), a Compact Disc Read Only Memory (CD-ROM), and the like.

The I/O device 1040 may include an input means such as a keyboard, a keypad, a touch screen, or a mouse, and an output means such as a speaker or a printer. In some embodiments, the display device 1060 may be included in the I/O device 1040.

The power supply 1050 may supply power necessary for an operation of the electronic device 1000. For example, the power supply 1050 may be a power management integrated circuit (PMIC). In some embodiments, the power supply 1050 may supply power to the display device 1060.

The display device 1060 may display an image corresponding to visual information of the electronic device 1000. The display device 1060 may be connected to other components through the buses or another communication link.

In the display device, the electronic device, and the method of driving the display device in accordance with the present disclosure, first sensing data may be acquired by performing a first sensing operation of emitting light by a pixel (or sub-pixel) and operating a photo sensing pixel, second sensing data may be acquired by performing a second sensing operation of not emitting light by the pixel and operating the photo sensing pixel, and a degradation degree of the pixel may be calculated based on the first sensing data and the second sensing data. Since the degradation degree of the pixel is not predicted by accumulating image data, but light (or degradation degree) of the pixel is directly measured using the photo sensing pixel, degradation compensation can be more accurately performed, and display quality can be improved.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, or elements described in connection with a particular embodiment may be used singly or in combination with features, characteristics, or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of driving a display device including a pixel and a photo sensing pixel, the method comprising:

performing a first sensing operation of emitting light by the pixel and operating the photo sensing pixel;

performing a second sensing operation of not emitting light by the pixel and operating the photo sensing pixel; and calculating a compensation value for compensating degradation of the pixel based on first sensing data according to the first sensing operation and second sensing data according to the second sensing operation.

2. The method of claim 1, wherein the pixel includes a light emitting element, the photo sensing pixel includes a light receiving element, and the light emitting element and the light receiving element are disposed in a same layer.

3. The method of claim 1, wherein some of the light emitted from the pixel is reflected inside the display device to reach the photo sensing pixel located adjacent to the pixel.

4. The method of claim 1, wherein the calculating the compensation value includes:

acquiring differential data by performing a subtraction operation on the first sensing data and the second sensing data;

calculating a degradation degree of the pixel based on comparing the differential data and baseline data; and calculating the compensation value, based on the degradation degree, and wherein the baseline data includes an average value of the first sensing data or the differential data, or the baseline data is differential data generated before the pixel is degraded.

5. The method of claim 1, wherein the performing the first sensing operation includes driving the pixel to emit light with a maximum brightness.

6. The method of claim 1, wherein the performing the first sensing operation includes driving pixels of the display device to emit light in a whole of a display surface of the display device.

7. The method of claim 1, further comprising:

performing a third sensing operation of allowing the pixel to emit light and allowing the photo sensing pixel to operate by reflecting the compensation value;

determining whether values of third sensing data according to the third sensing operation are uniform; and repeating the performing of the first sensing operation, the performing of the second sensing operation, and the calculating of the compensation value when the values of the third sensing data are not uniform.

8. The method of claim 1, wherein the pixel includes sub-pixels each of which is configured to emits light of a different color, wherein the performing the first sensing operation drives only one sub-pixel of the sub-pixels to emit light, and wherein the calculating the compensation value calculates the compensation value for the one sub-pixel of the sub-pixels.

9. The method of claim 1, further comprising determining whether an object exists on a display surface of the display device through a touch sensor, wherein the first sensing operation is performed when the object does not exist on the display surface, and wherein the first sensing operation is not performed when the object exists on the display surface.

10. The method of claim 1, further comprising determining whether an illuminance calculated based on the second sensing data is smaller than a reference value, wherein the first sensing operation is performed when the illuminance is smaller than the reference value, and wherein the first sensing operation is not performed when the illuminance is greater than or equal to the reference value.

11. A display device comprising:

a display panel including a pixel and a photo sensing pixel;

a panel driver configured to drive the pixel to emit light; and a sensor driver configured to operate the photo sensing pixel, wherein the sensor driver acquires first sensing data by operating the photo sensing pixel while the pixel emits light, and acquires second sensing data by operating the photo sensing pixel while the pixel does not emit light, and wherein the panel driver calculates a compensation value for compensating degradation of the pixel based on the first sensing data and the second sensing data.

12. The display device of claim 11, wherein the pixel includes a light emitting element, the photo sensing pixel includes a light receiving element, and the light emitting element and the light receiving element are disposed in a same layer.

13. The display device of claim 11, wherein some of the light emitted from the pixel is reflected inside the display device to reach the photo sensing pixel located adjacent to the pixel.

14. The display device of claim 11, wherein the panel driver acquires differential data by performing a subtraction operation on the first sensing data and the second sensing data, calculates a degradation degree of the pixel based on comparing the differential data and baseline data, and calculates the compensation value, based on the degradation degree, and wherein the baseline data includes an average value of the first sensing data or the differential data, or the baseline data is differential data generated before the pixel is degraded.

15. The display device of claim 11, wherein, when the sensor driver acquires the first sensing data, the panel driver drives pixels of the display device to emit light with a maximum brightness in a whole of a display surface of the display panel.

16. The display device of claim 11, wherein the panel driver allows the pixel to re-emit light by reflecting the compensation value, and the sensor driver acquires third sensing data by allowing the photo sensing pixel to operate while the pixel re-emits light, and determines whether values in the third sensing data are uniform.

17. The display device of claim 11, wherein the pixel includes sub-pixels each of which emits light of a different color, and wherein the sensor driver acquires the first sensing data by operating the photo sensing pixel while only one sub-pixel of the sub-pixels emits light, and calculates a compensation value for the one sub-pixel of the sub-pixels.

18. The display device of claim 11, further comprising a touch sensor configured to sense an object on a display surface of the display device, wherein the sensor driver acquires the first sensing data when the object does not exist on the display surface, and does not acquire the first sensing data when the object exists on the display surface.

19. The display device of claim 11, wherein the sensor driver determines whether an illuminance calculated based on the second sensing data is smaller than a reference value, acquires the first sensing data when the illuminance is smaller than the reference value, and does not acquire the first sensing data when the illuminance is greater than or equal to the reference value.

20. An electronic device comprising:

a processor configured to provide an input image data;

a display device configured to display an image, based on the input image data; and a power supply configured to supply power to the display device, wherein the display device includes:

a display panel including a pixel and a photo sensing pixel;

a panel driver configured to drive the pixel to emit light; and a sensor driver configured to operate the photo sensing pixel, wherein the sensor driver acquires first sensing data by operating the photo sensing pixel while the pixel emits light, and acquires second sensing data by operating the photo sensing pixel while the pixel does not emit light, and wherein the panel driver calculates a compensation value for compensating degradation of the pixel based on the first sensing data and the second sensing data.

* * * * *